April 9, 1968     T. GARBER ETAL     3,376,735

PRESSURE MEASURING APPARATUS

Filed Sept. 3, 1964

INVENTORS
THOMAS GARBER
DAVID E. KELCH
NORMAN H. MAC NEIL

BY    Q. C. Smith

ATTORNEY

United States Patent Office 3,376,735
Patented Apr. 9, 1968

3,376,735
PRESSURE MEASURING APPARATUS
Thomas Garber, Framingham, David E. Kelch, Woburn, and Norman H. MacNeil, Waltham, Mass., assignors to Hewlett-Packard Company, Palo Alto, Calif., a corporation of California
Filed Sept. 3, 1964, Ser. No. 394,137
9 Claims. (Cl. 73—80)

ABSTRACT OF THE DISCLOSURE

A tonometer in which a pressure-sensing differential transformer and a gravity-sensing differential transformer are connected in phase opposition to the output of the tonometer for canceling out a gravitational error signal and in which a thermally-sensitive resistive network is connected in series with the secondary winding of the pressure-sensing differential transformer to compensate for thermal zero shift.

Figure 1:
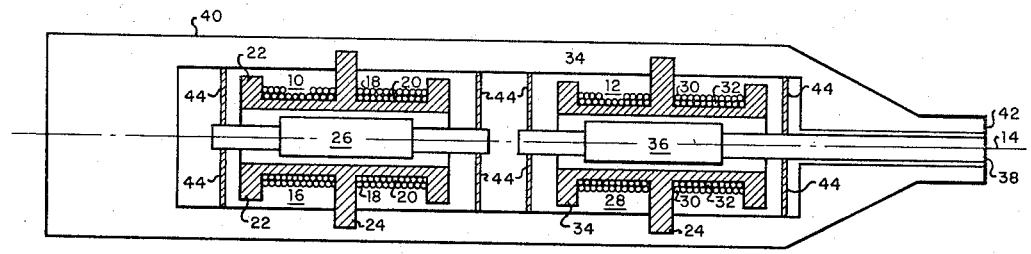

This invention relates to an apparatus for the measurement of the pressure within a body having a flexible wall and more particularly to the measurement of physiologic pressure.

A typical example of such apparatus is the tonometer used by the ophthalmologist to diagnose glaucoma, a major cause of irreversible adult blindness which is best detected by noting its main characteristic, an increase in the hydrostatic pressure within the eye. Tonometers, mechanical or electronic, generally obtain a pressure reading by measuring either the indentation of the cornea produced by a certain size and shape probe of a given weight, or the force required to applane (flatten) a given area of the cornea.

For example, in one tonometer a spring restrained armature (probe) is applied to the eye with sufficient force to applane a given area thereof. The resultant deflection of the armature is detected by a differential transformer and converted to a stylus deflection indicating pressure on a recorder chart. However, the accuracy of such tonometers is subject to several limitaions. First, they tend to exhibit significant thermal zero shift, an output which occurs with zero pressure signal due to temperature changes. Since armature deflections typically are in the microinch range, small armature deflections due to relative thermal expansion can result in excessive thermal zero shift. Second, the mass of the suspended armature results in a high gravitational sensitivity of the order of twenty-five millimeters of mercury per $g$ (a $g$ is an acceleration of 32.17 feet per second per second).

It is the principal object of this invention to provide an improved tonometer wherein the thermal zero shift and the gravitational sensitivity are substantially reduced.

In accordance with the illustrated embodiment of this invention an improved tonometer is provided for measuring the pressure within a body having a flexible wall. The apparatus comprises a pair of sensing units longitudinally positioned on a common axis and coaxially supported within an outer housing having an annular flat surface at one end. Each sensing unit includes a differential transformer having concentric primary and secondary windings with a spring restrained armature coaxially disposed therein for deflection along the common axis. The primary windings of the differential transformers are serially connected between a pair of input terminals. The secondary windings are conected so that simultaneous and equal deflection of the armatures in response to a selected physical effect generates a pair of signals of similar magnitude and substantially opposite phase at the output terminals. One of the armatures has a flat contact surface which is proximately coplanar with the annular flat surface of the outer housing before being pressed against the outer surface of the body under test. A thermal sensitive load connected to the secondary winding surrounding the last mentioned armature provides thermal zero shift compensation.

Figure 2:
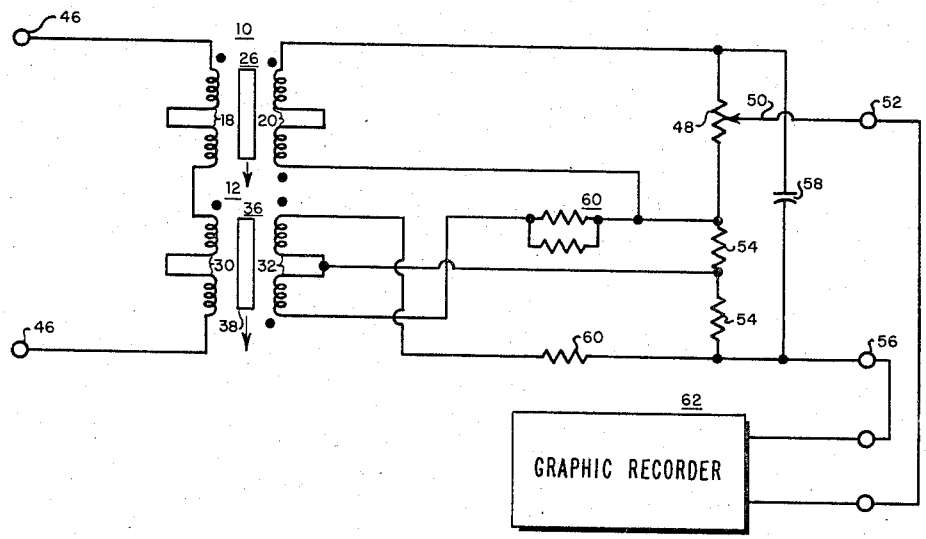

Other and incidental objects of this invention will be apparent from a reading of this specificaion and an inspection of the accompanying drawing in which:

FIGURE 1 is a sectional view of an improved tonometer according to this invention; and FIGURE 2 is a schematic view of the tonometer of FIGURE 1.

Referring to FIGURE 1, there is shown a tonometer including a gravity sensing unit 10 and a pressure sensing unit 12 longitudinally positioned on a common axis 14. Gravity sensing unit 10 comprises a differential transformer 16 having a primary winding 18 and a secondary widing 20 concentrically mounted on an electrical insulating bobbin 22. Bobbin 22 is provided with a centrally positioned mounting flange 24 and is made of a material having high dimensional stability with temperature. An armature 26 is coaxially positioned within the bobbin 22 for longitudinal deflection along the common axis 14. Pressure sensing unit 12 similarly includes a differential transformer 28 having primary and secondary windings 30 and 32 concentrically mounted on a bobbin 34 and is identical in construction except that the armature 36 has a flat contact surface 38 disposed normally to the common axis 14 at one end.

A housing 40 having a flat annular contact surface 42 at one end coaxially encases the sensing units 10 and 12. Housing 40 is made of invar, a metallic alloy having a small coefficient of thermal expansion, and is encased in a jacket made from a paper base phenolic cylinder having a low thermal conductivity to reduce thermal zero shift due to thermal gradients introduced when the device is held in the operator's hand. The flanges 24 are rigidly fixed to the inner wall of housing 40 to support the sensing units 10 and 12. Armatures 26 and 36 are held in suspension and restrained from movement by flat springs 44 made of invar. The springs 44 suspending each armature are attached to that armature and the inner wall of housing 40 at points symmetrically disposed on either side of the corresponding flange 24 to further reduce thermal zero shift. The thermal expansion of armatures 26 and 36, springs 44, bobbins 22 and 34, and housing 40 may be different, but the symmetry of these elements about the flanges 24 helps to reduce thermal zero shift resulting from differences in the thermal expansions thereof. Armatures 26 and 36 are disposed longitudinally along the common axis 14 such that before the tonometer is pressed against the outer surface of the body under test the contact surfaces 38 and 42 of armature 36 and housing 40 are concentric and proximately coplanar.

The mass of the suspended armature 36 of the pressure sensing unit 12 produces an acceleration sensitivity of about 25 mm. Hg/$g$. This is reduced to less than one mm. Hg/$g$. by the gravity sensing unit 10 which is mounted in alignment with the pressure sensing unit 12. As shown in FIGURE 2, the secondary windings 20 and 32 of differential transformers 16 and 28 are connected so that the gravity component of the signal generated by deflection of armature 36 is balanced out by a gravity signal of opposite phase generated by simultaneous deflection of armature 26.

Referring to FIGURE 2, the primary windings 18 and 30 of the gravity and pressure sensing units 10 and 12 are shown serially connected between input terminals 46. The secondary winding 20 of gravity sensing unit 10 is connected across a variable load resistor 48 having an adjustable contact 50 connected to an output terminal 52. Adjustable contact 50 provides a gravity signal balance control. A pair of load resistors 54 chosen for magnitude of zero shift correction is serially connected between an output terminal 56 and one side of variable load resistor 48. Secondary winding 32 of pressure sensing unit 12 is connected across load resistors 54 in such a manner that the gravity component of the signal produced by deflection of armature 36 is balanced out by a gravity signal of opposite phase produced by gravity sensing unit 10. A large capacitor 58 is connected in shunt with serially connected load resistors 48 and 54. Thermally sensitive resistance networks 60 are connected in series with secondary winding 32 to vary the load thereon as a function of temperature, thereby reducing the effects of thermal zero shift. The sense of this thermal zero shift correction is determined by the relative positions of the thermally-sensitive resistance networks 60. For relatively low thermal zero shifts the change in resistance of the copper in the windings together with the dissimilar thermal coefficients of resistance of the resistance networks 60 provides adequate compensation, but larger shifts may require the use of components such as thermistors. In any case the compensation networks 60 must be designed so as not to introduce excessive quadrature. The use of the compensation networks 60 coupled with the completely symmetrical design of the device and the thermally insulating jacket disposed on housing 40 effectively serve to minimize thermal zero shift.

A readout device 62, for example a graphic recorder, is connected to output terminals 52 and 56 and calibrated to provide a pressure reading when the armature 36 of the pressure sensing unit 12 is pressed against the outer wall of the body under test.

We claim:
1. Measuring apparatus for use on a body under test, said measuring apparatus comprising:
   an outer member;
   displacement means including a first displacement element that is supported within said outer member for longitudinal displacement, said displacement means being disposed for being pressed against the body under test to displace said first displacement element;
   first sensing means supported within said outer member for continuously providing a first signal proportional to the longitudinal displacement of said first displacement element from a reference position;
   a second displacement element supported within said outer member for longitudinal displacement in a direction substantially parallel to the direction of displacement of said first displacement element;
   second sensing means supported within said outer member for continuously providing a second signal proportional to the longitudinal displacement of said second displacement element from a reference position due to a physical effect acting upon said first and second displacement elements; and
   circuit means connected to said first and second sensing means for combining said first and second signals in phase opposition to continously reduce an error component of said first signal caused by longitudinal displacement of said first displacement element from its reference position due to the physical effect acting thereupon.

2. Measuring apparatus as in claim 1 including measurement means connected to said circuit means and responsive to the combination of said first and second signals in phase opposition for indicating the displacement of said first displacement element.

3. Measuring apparatus for measuring an internal property of a body under test by depressing the outer surface of the body, said measuring apparatus comprising:
   an input and an output;
   an outer member;
   displacement means including a first displacement element that is supported within said outer member for longitudinal displacement therein, said displacement means being disposed for depressing the outer surface of the body and thereby displacing said first displacement element by an amount related to the internal property of the body;
   a first reactive sensing unit associated with said first displacement element and connected between said input and said output, said first reactive sensing unit being supported within said outer member for continuously providing a first signal proportional to the longitudinal displacement of said first displacement element from a reference position;
   a second displacement element supported within said outer member for longitudinal displacement in a direction substantially parallel to the direction of displacement of said first displacement element;
   a second reactive sensing unit associated with said second displacement element and connected between said input and said output, said second reactive sensing unit being supported within said outer member for continously providing a second signal proportional to the longitudinal displacement of said second displacement element from a reference position due to a physical effect acting upon said first and second displacement elements; and
   circuit means connecting said first and second reactive sensing units to said output for combining said first and second signals in phase opposition at said output to continuously reduce an error component of said first signal caused by longitudinal displacement of said first displacement element from its reference position due to the physical effect acting thereupon.

4. Measuring apparatus as in claim 3 wherein:
   each of said first and second reactive sensing units comprises at least a pair of mutually coupled coils; and
   each of said first and second displacement elements is resiliently supported within said outer member for longitudinal displacement therein, whereby longitudinal displacement of each of said first and second displacement elements from its reference position varies the mutual coupling between the coils of its associated reactive sensing unit to produce the signal proportional to its displacement.

5. Measuring apparatus as in claim 4 including measurement means connected to said output and responsive to the combination of said first and second signals in phase opposition for measuring the displacement of said first displacement element.

6. Measuring apparatus as in claim 5 including a thermally-sensitive resistance network serially connected between one of said coils and said output for reducing another error component of said first signal caused by a thermal gradient.

7. Measuring apparatus for measuring the pressure within a body having a flexible wall, said measuring apparatus comprising:
   an input and an output;
   an outer member having an aperture at one end;
   first and second displacement elements resiliently supported within said outer member for longitudinal displacement therein along a common axis, said first displacement element including a contact portion positioned substantially at said aperture for being pressed against the flexible wall of the body to displace said first displacement element;
   a first sensing unit supported within said outer member around said first displacement element for continuously providing a first signal proportional to the displacement of said first displacement element from a reference position;
   first circuit means connecting said first sensing unit between said input and said output for applying said first signal to said output;
   a second sensing unit supported within said outer member around said second displacement element for continuously providing a second signal proportional to displacement of said second displacement element from a reference position due to a gravitational force acting upon said first and second displacement elements; and second circuit means connecting said second sensing unit between said input and said output for applying said second signal to said output in phase opposition to said first signal to reduce an error component of said first signal caused by the gravitational force acting upon said first displacement element.

8. Measuring apparatus as in claim 7 wherein:

each of said first and second sensing units comprises a primary winding and a secondary winding forming a differential transformer with the corresponding one of said first and second displacement elements; and said first and second circuit means connect said primary windings to said input and connect said secondary windings to said output so that for simultaneous and equal displacements of said first and second displacement elements said first and second signals are substatnially equal in magnitude and opposite in phase at said output.

9. Measuring apparatus as in claim 8 wherein said first circuit means includes a thermally-sensitive resistance network connected between the secondary winding of said first sensing unit and said output for reducing another error component of said first signal caused by a thermal gradient.

References Cited
UNITED STATES PATENTS

| | | | |
|---|---|---|---|
| 2,519,681 | 8/1950 | Mages | 73—80 |
| 3,164,995 | 1/1965 | Federn et al. | 73—71.2 |
| 3,184,960 | 5/1965 | Murr et al. | 73—80 |

RICHARD C. QUEISSER, *Primary Examiner.*

JAMES J. GILL, *Examiner.*

I. C. McCLELLAND, *Assistant Examiner.*